H. G. FREEMAN.
VALVE.
APPLICATION FILED JAN. 27, 1916.

1,204,265.

Patented Nov. 7, 1916.

Inventor—
Harry G. Freeman
by his Attorneys

UNITED STATES PATENT OFFICE.

HARRY G. FREEMAN, OF ATLANTIC CITY, NEW JERSEY, ASSIGNOR OF ONE-HALF TO WILLIAM H. BARTLETT, OF ATLANTIC CITY, NEW JERSEY.

VALVE.

1,204,265.  Specification of Letters Patent.  Patented Nov. 7, 1916.

Application filed January 27, 1916. Serial No. 74,666.

*To all whom it may concern:*

Be it known that I, HARRY G. FREEMAN, a citizen of the United States, and a resident of Atlantic City, Atlantic county, New Jersey, have invented certain Improvements in Valves, of which the following is a specification.

Figure 1:
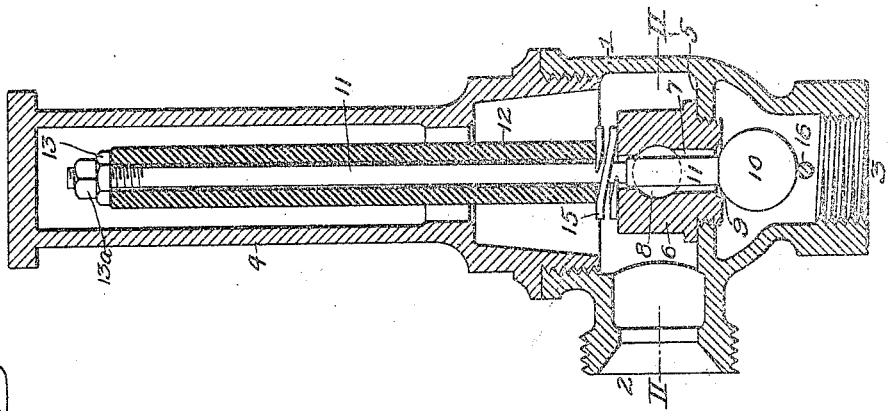
Figure 3:
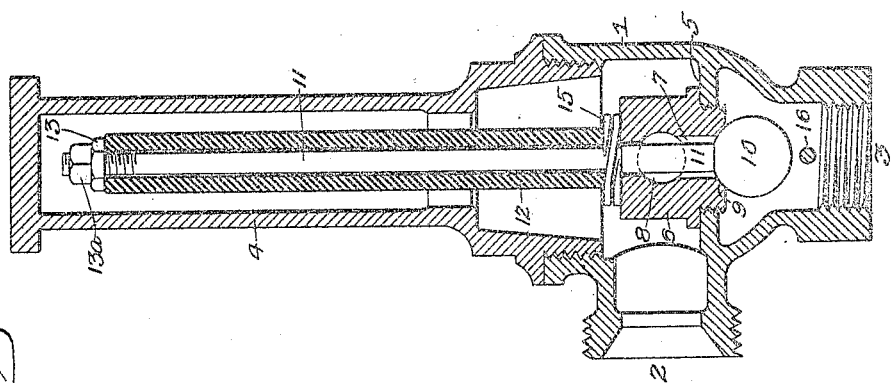
Figure 2:
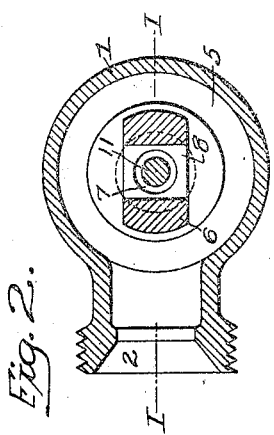
Figure 4:
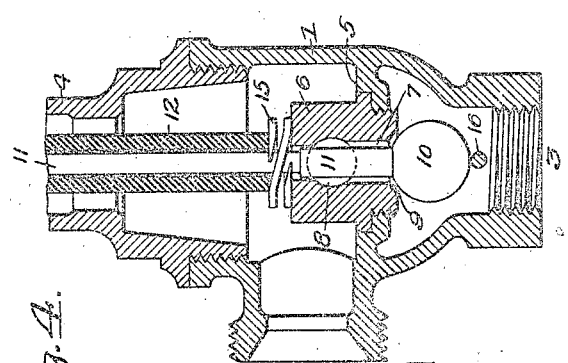

My invention relates to valves of the thermostatic type; and one object of my invention is to provide an improved valve for the vacuum side of radiators employed in low pressure steam heating systems; a further object of my invention being to provide a ball valve, and to so arrange such valve that it will be lifted to its seat; such lifting being effected by an expansion member which lengthens under heat. The valve is so arranged that it will drop away from such seat by gravity when the expansion member cools and contracts. These and other features of my invention are more fully described hereinafter, reference being had to the accompanying drawings, in which:

Figure 1, is a sectional elevation of my improved valve, taken on the line I—I, Fig. 2; Fig. 2, is a sectional plan view on the line II—II, Fig. 1; Fig. 3, is a view similar to Fig. 1, showing the valve seated, and Fig. 4, illustrates a modified arrangement within the scope of my invention.

In the drawings, 1 represents the shell or casing of a valve structure to be mounted on the vacuum side of a radiator, said structure having an inlet 2 for the passage of steam or vapor from said radiator, and an outlet 3 to the vacuum pump; the valve casing being provided with a closed bonnet 4 which may extend some distance above the valve casing.

Within the valve casing is a diaphragm 5, to which is secured in any suitable manner a plug 6, having a through opening or aperture 7 in axial alinement with the bonnet 4, and an aperture or through opening 8 at right angles to said opening 7. The plug 6 on its under side adjacent the lower portion of the aperture or through opening 7 is ground to form a seat 9 for a valve 10; such valve being preferably in the shape of a ball and being carried by a stem 11 of less diameter than the opening 7 and which stem passes through the opening 7 of the plug 6 and through a tubular expansion member 12 to which it is adjustably connected by the nuts 13, 13ª; the latter serving as a lock nut when the parts are adjusted.

The expansion tube may be made of a suitable material; rubber composition, or any material that will not be destroyed by the heat involved, and will expand and contract in the proper manner so as to raise the valve 10 to its seat under the desired conditions; that is to say, when the heat of the steam passing from the radiator rises above the desired temperature and causes such expansion member to increase its length.

To avoid danger of deforming or buckling the valve stem 11, I may place a spring washer or similar member 15 between the plug 6 and the expansion tube 12 so that excessive movement of the tube will be relieved by such spring washer. In lieu of placing the spring washer adjacent the plug, such spring washer may be interposed between the upper end of the valve stem and the nut 13.

To prevent the valve and valve stem dropping away and becoming displaced in the pipe leading to the vacuum pump should it be necessary to effect repairs or replace the expansion tube, I prefer to arrange in the passage directly below the ball valve a cross bar 16, which may be cast integral with the rest of the valve body or casing, or introduced in any suitable manner.

As illustrated in Fig. 1 of the drawings, the cross opening or aperture 8 in the plug is in such position that a small amount of water of condensation will remain in the chamber of the valve casing at all times. This is not objectionable, but in some instances it may be otherwise arranged, as for instance by placing the lower wall of the aperture 8 in the plug in substantially the same plane as that of the diaphragm or wall 5 of the valve casing, as shown in Fig. 4, so that all water of condensation may wash out when the valve 10 is open. The water of condensation washing through the openings of the plug 6 will keep the valve and the seat for the latter clean so that the structure will be in operative condition at all times.

I claim:

1. A thermostatic valve comprising a body having a closed heating chamber and a wall or diaphragm with a valve seat, a valve adapted to engage said seat from below, a stem carried by said valve and extending through said seat and to a point above the same, an expansion member on the stem above said seat, said member being contained within said heating chamber, means providing a loose connection between said stem and member whereby the latter is free to expand and contract under changes in temperature and seat the valve when moving in one direction and to permit the valve to unseat when moving in the opposite direction, and means contained within said heating chamber between the valve seat and the lower end of the expansion member adapted to compensate for any excess movement of said expansion member.

2. A thermostatic valve comprising a body having a closed heating chamber and a wall or diaphragm provided with a valve seat on its under side, a stem extending through said seat beyond the opposite side thereof and having a valve to engage the seat from below, an expansion member surrounding said stem and contained within said heating chamber so as to be subject to changes of temperature therein, and a spring member between the lower end of the expansion member and the valve seat and contained within said heating chamber, said spring adapted to compensate for any excess movement of the expansion member.

3. A thermostatic valve comprising a body, and a closed bonnet extension thereof said body having a wall or diaphragm with a plug mounted thereon having a valve seat on its underside, said plug being apertured in two directions, a stem within the bonnet of said body and extending through one of the apertures of the plug and having a valve adapted to engage the seat of said plug from below, an expansion member surrounding the valve stem above said plug and contained within the closed bonnet of said body, and means providing a loose connection between said stem and expansion member whereby the latter is free to expand and contract under changes in temperature and to seat the valve when moving in one direction and to permit the valve to unseat when moving in the opposite direction.

4. A thermostatic valve comprising a body, and a closed bonnet extension thereof said body having a wall or diaphragm with a plug mounted thereon having a valve seat on its underside, said plug being apertured in two directions, a stem within the bonnet of said body and extending through one of the apertures of the plug and having a valve adapted to engage the seat of said plug from below, an expansion member surrounding the valve stem above said plug and contained within the closed bonnet of said body, means providing a loose connection between said stem and expansion member whereby the latter is free to expand and contract under changes in temperature and to seat the valve when moving in one direction and to permit the valve to unseat when moving in the opposite direction, and a coiled spring interposed between the end of the expansion member and the adjacent surface of the plug adapted to compensate for any excess movement of the expansion member.

HARRY G. FREEMAN.